United States Patent
Haga (10) Patent No.: US 6,366,576 B1
(45) Date of Patent: Apr. 2, 2002

(54) METHOD FOR ROUTING CALLS FROM A TERMINAL IN A FIRST TELECOMMUNICATION NETWORK TO ANY TERMINAL IN AN EXTERNAL TELECOMMUNICATION NETWORK

(75) Inventor: Børge Haga, Oslo (NO)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/160,930

(22) Filed: Sep. 25, 1998

(30) Foreign Application Priority Data

Sep. 29, 1997 (NO) ................................................ 974487

(51) Int. Cl.[7] .......................... H04L 12/66; H04L 12/28
(52) U.S. Cl. ...................... 370/352; 370/401; 455/445
(58) Field of Search ................................ 370/230, 231, 370/235, 236, 259, 260, 351, 352, 400, 401; 379/202; 455/414, 416, 445

(56) References Cited

U.S. PATENT DOCUMENTS

| 4,706,080 A | 11/1987 | Sincoskie | 340/825.02 |
|---|---|---|---|
| 4,815,128 A | 3/1989 | Malek | 380/9 |
| 5,027,350 A | 6/1991 | Marshall | 370/85.13 |
| 5,031,093 A | 7/1991 | Hasegawa | 364/200 |
| 5,088,032 A | * 2/1992 | Bosack | 395/200 |
| 5,182,550 A | 1/1993 | Masuda et al. | 340/825.05 |
| 5,361,256 A | 11/1994 | Doeringer et al. | 370/60 |
| 5,442,633 A | 8/1995 | Perkins et al. | 370/94.1 |
| 5,517,620 A | 5/1996 | Hashimoto et al. | 395/200.15 |
| 5,583,862 A | 12/1996 | Callon | 370/397 |
| 5,867,495 A | * 2/1999 | Elliot | 370/352 |
| 6,064,653 A | * 5/2000 | Farris | 370/237 |
| 6,067,442 A | * 5/2000 | Wiedeman et al. | 455/13.1 |
| 6,069,890 A | * 5/2000 | White et al. | 370/352 |
| 6,151,628 A | * 11/2000 | Xu et al. | 70/225 |

FOREIGN PATENT DOCUMENTS

| EP | 0300350 A3 | 1/1989 |
|---|---|---|
| WO | PCT/JP95/02012 | 4/1996 |

* cited by examiner

Primary Examiner—Alpus H. Hsu
Assistant Examiner—Duc Ho
(74) Attorney, Agent, or Firm—Jenkens & Gilchrist (57) ABSTRACT

The present invention relates to a method for routing calls from a terminal in a first telecommunication network, for example an intranet, to any terminal in an external telecommunication network, the interworking between said networks taking place through one of several interworking units or so-called gateways (GW), and in order to provide a method which in a more effective manner can optimise such interworking between such networks, it is according to the present invention suggested that there is used at least one routing entity which routes the call or calls through a gateway (GW1, GW2) giving the most optimal route, for example the most cost effective or resource effective route.

9 Claims, 6 Drawing Sheets

| Operator | CountryCode | #OfPorts | CallSignalAddress |
|---|---|---|---|
| Operator1 | 47 | 30 | aaa.bbb.ccc.ddd |
| Operator1 | 46 | 24 | eee.fff.ggg.hhh |
| Operator1 | 45 | 30 | iii.jjj.kkk.lll |
| Operator2 | 47 | 30 | mmm.nnn.ooo.ppp |
| Operator2 | 46 | 24 | qqq.rrr.sss.ttt |
| Operator3 | 47 | 30 | uuu.vvv.www.xxx |
| Operator4 | 46 | 24 | yyy.aaa.bbb.ccc |
| *** | *** | *** | *** |
| Default | any | 30 | zzz.aaa.bbb.ccc |

METHOD FOR ROUTING CALLS FROM A TERMINAL IN A FIRST TELECOMMUNICATION NETWORK TO ANY TERMINAL IN AN EXTERNAL TELECOMMUNICATION NETWORK

FIELD OF THE INVENTION

The present invention relates to a method for routing calls from a terminal in a first telecommunication network, for example an intranet, to any terminal in an external telecommunication network, the interworking between said networks taking place through one of several interworking units or so-called gateways.

BACKGROUND OF THE INVENTION

The Problem Areas
Problem Intranets

Intranets can exceed country borders, and in fact many corporate networks are covering nearly the whole world. The cost of communicating within an intranet is usually much lower than using external communication services, and the intranets usually do not see the country borders. This means that the cost of communicating within an intranet is less dependant on the geographical distance between the endpoints and more on initial investment in network infrastructure. This is in sharp contrast to the charging involved when using commercial telephone services, where distance and duration of call more directly determines the cost of a call.

New emerging standards within video and audio conferencing now make it possible to have audio and video conferences/calls within PSTN (ISDN) networks, the Internet, Intranets and Local Area Networks.

Since other network domains now support making audio and video conferences/calls, the need for ways of interworking between these different kind of networks has emerged. These interworking units are called gateways, and they provide the conversions necessary (protocol, audio format, video format etc.) for endpoint/terminals residing in different kinds of networks, to be able to communicate with each other.

There are no limitations on the number of gateways which can be connected to these networks, which means that an intranet can have access to several gateways in order for a terminal inside the intranet to call e.g. an ISDN video conferencing terminal.

Because of cost issues it would be desirable for example to establish a connection through the gateway residing closest to the receiving party on e.g. the PSTN or ISDN network. For example, since an intranet can cross country borders it could be desirable to place one gateway in each country and avoid expensive international calls by always calling out through the gateway residing in the country where the receiving party is located.

Known solutions and problems with these

Related problems have probably been solved for circuit-switched (telephony) networks, where routing tables assure that distributed companies with local telephone networks route as much as possible of each call within the local network before entering the public telephony network. This should apply to packet networks (intranets, LANs etc.) as well, but routing tables must with this solution be entered manually. This invention proposes inter alia a way for a dynamic generation of routing tables for audiovisual communication when going from packet-networks to other networks (circuit- and packet networks) via gateways by the automatic update of routing information from gateways to the routing entities within the packet network.

OBJECTS OF THE INVENTION

An object of the invention is to provide a method whereby such routing of calls can be affected in a generally most optimal manner.

Another object of the invention is to provide a method wherein such routing may be affected in the most cost effective manner.

Still another object of the present invention is to provide wherein such routing may be affected in the most resource effective manner.

Yet another object of the invention is to provide a method selection of network operators may be made in an effective manner.

An object of the invention is also to provide a combined optimalization of such routing and selection.

BRIEF DISCUSSION OF THE INVENTION

These objects are achieved by a method as stated in the preamble, which according to the present invention is characterized in that there is used at least one routing entity which routes the call or calls through a gateway (GW1, GW2) giving the most optimal route, for example the most cost effective or resource effective route.

In other words, the invention proposes inter alia to automatically route interworking calls (i.e. over gateways) from packet-networks through the gateway giving the most cost effective charge by using a routing table which is automatically updated each time a new gateway is introduced into the network.

Reference in this invention proposal is done for example towards an emerging ITU standard H.323 for IP based video/audio/data conferencing, but the invention should apply equally to packet networks in which registering functions are available and calls to other networks are available (e.g. Internet, Intranet telephony, voice over IP, etc.).

In a specific embodiment of the invention the key approach is for the routing entity (from now on referred to as gatekeeper, logical switch, when referring to audio-visual communication on packet networks) to know which gateways exist, and in what country or region they are connected to the public telephony network. When the gatekeeper knows this, it can for example analyse parts of the E.164 number (given to the gatekeeper by the caller residing inside the packet-network/intranet upon initiation of an interworking call) for the receiving party outside the intranet in order to route the call to the most appropriate gateway. In this way as much as possible of the call propagates within the packet-network/intranet and that the most local gateway to the receiving party (charging wise) is selected for putting the call out on the public telephony network.

Further features and advantages will appear from the following description taken in connection with enclosed drawings, as well as from the appending patent claims.

DETAILED DESCRIPTION OF EMBODIMENTS

Figure 1:
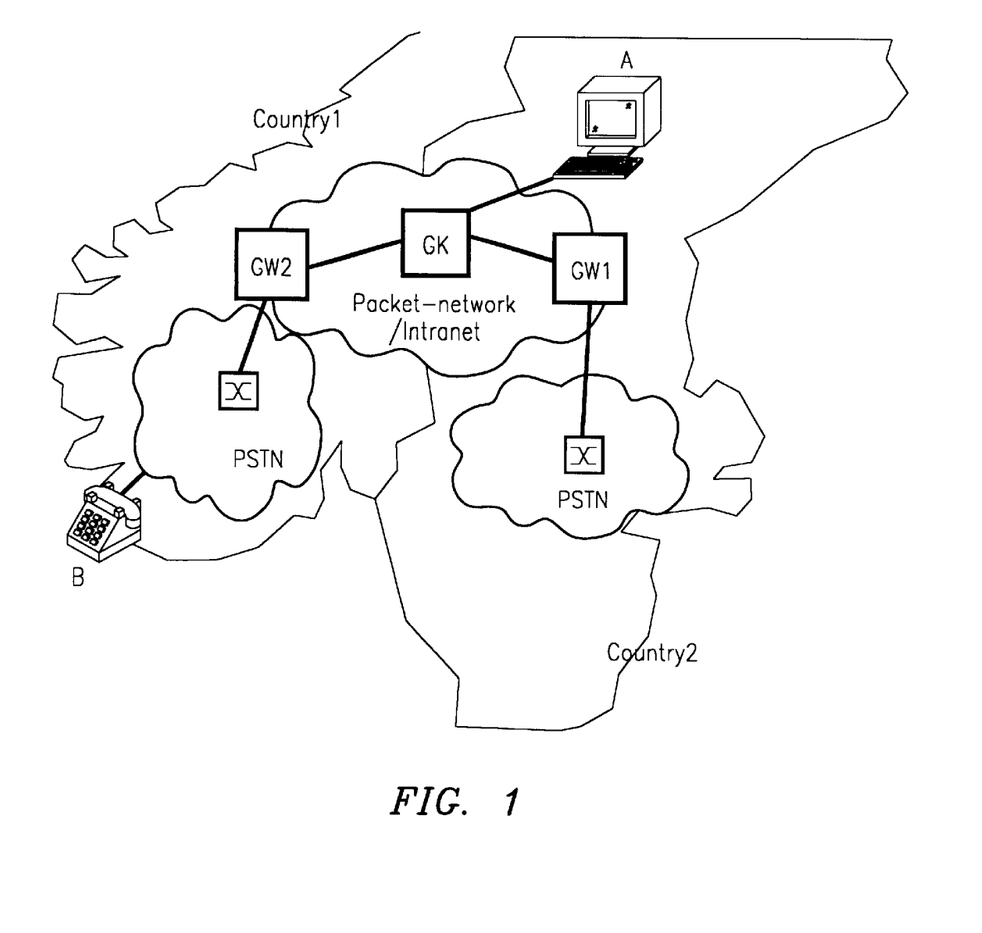
FIG. 1 is a simplified view indicating a first embodiment of network configurations, wherein the method according to the present invention can be applied.

In connection with FIG. 1 there is illustrated an example of how the method according to the present invention can be applied. Basically, the invention suggests a method for routing calls from a terminal in a first telecommunication network, for example an intranet or a packet-network, to any terminal, for example terminal B, in an external telecommunication network, PSTN, the interworking between said networks taking place through one of several interworking units or so-called gateways, GW1 and GW2.

FIG. 1 is a simplified view. A more complex view would be where the intranet includes several gatekeepers and at least two types of gateways (i.e. gateways to both PSTN (POTS) which is audio only, and gateways to ISDN videoconferencing with both video and audio).

Caller A wants to make a call to receiving party B. Caller A is calling from a terminal (e.g. a PC-terminal with client software and hardware compliant with ITU-T H.323 (ref. 1), while receiving party B is using a POTS telephone. The gatekeeper GK, being the logical switch, is responsible for routing the call to the appropriate gateway. The issue is for the gatekeeper to choose GW2 for the call since that gateway resides in the same country as the receiving party B and therefore will lead to a less expensive call since it will be a national call instead of an international call. Choosing GW1 will lead to an international call between for example Sweden and Norway over the PSTN network.

When a gateway is introduced into the intranet, it has to register with the gatekeeper(s) (according to standards for audio-visual communication over packet networks i.e. ITU-T H.323 (ref. 1)).

The gateway initiates this by sending out a multicast message (according to ITU-T H.225 section for RAS signalling (ref. 4)) called GRQ (Gatekeeper Request). The gatekeeper which is willing to take the gateways registration will return a GCF (Gatekeeper confirmation).

Upon receiving the GCF, the gateway will send an RRQ (Registration Request) to the gatekeeper which has accepted its registration. One of the message fields in this message is called nonStandardData. It is part of this invention's idea to use this field (until a more specific country- or area-code attribute is specified for this message) to send the country (or area) code for the PSTN network this gateway connects to. The gatekeeper will store this country code in a table either locally or in a central database for the whole intranet. The latter is necessary if several gatekeepers coexist in the intranet. The table will have at least 2 columns, where one is the country code (according to E.164) ref. 3)) and the other is the callSignalAddress (sequence of TransportAddress) (ITU-T H.225 (ref. 4)).

Figure 2:
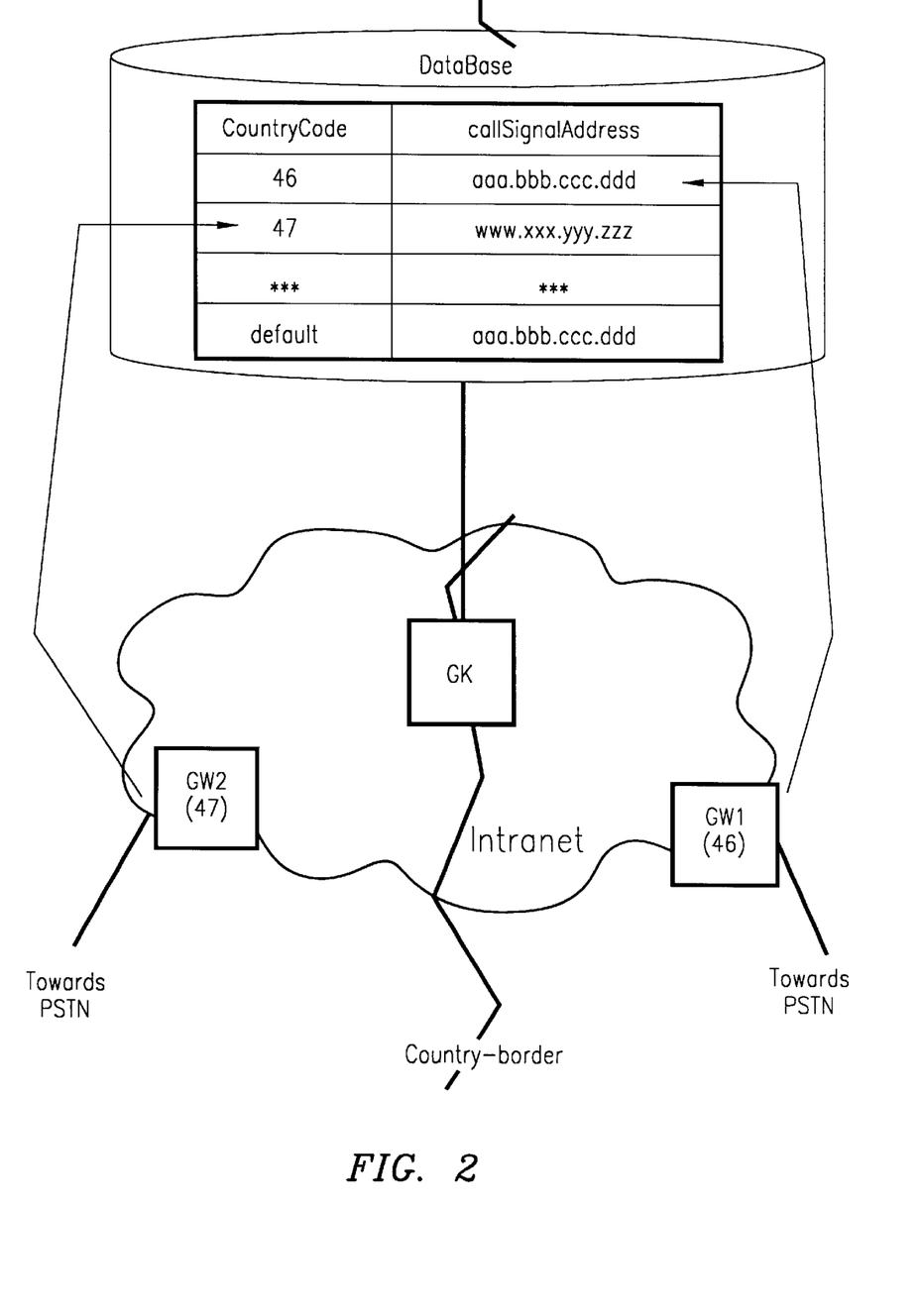
FIG. 2 is an extract of FIG. 1, on a larger scale, and completed with further details including an appropriate table.

A complete table of all the gateways will be registered in this gateway-table, as shown in FIG. 2, and in addition an entry will be added to the table describing which address to connect to as default.

When caller A wants to set up a call to receiving party B (+47 66842634), the gatekeeper will analyse the country code part of the E.164 (ref. 3) destinationaddress in the Setup (ITU-T H.225 (ref. 4)) message from caller A to the gatekeeper. By doing a lookup in the gateway-table, the gatekeeper will find that a gateway connecting to country code 47 is reachable from the intranet. The gatekeeper will then use the corresponding callSignalAddress entry to route the call to the gateway which is residing in the same country as the receiving party. If the gatekeeper is unable to find a matching country code entry in the gateway-table, the gatekeeper will use the callSignalAddress associated with the default entry in the table.

In the particular example the gatekeeper will see that caller A wants to call 47 66842634, and therefore use the table to find out that GW2 should be contacted at address www.xxx.yyy.zzz.

It is to be understood that there is no limitation on this invention saying that this should apply to intranets crossing country borders only.

One could use the present method for intranets crossing areas within a country as well, since calling within one area of the country is usually cheaper than crossing areas. In this case the gateway-table would have to be enhanced with an additional column listing the different gateways' area codes (in addition to their country code).

In addition to this, and as illustrated in FIG. 2, it could be advantageous to add more intelligence to the search for the best gateway. In cases where a matching country (or area) code is not found, it could be desirable to introduce a scheme/algorithm where the country (or area) code closest in number value to the desired one is chosen instead of the default entry. This is based on the fact that country (and area) codes for adjacent countries (or areas) usually has adjacent numbers for country (and area code). In cases where this is not good enough, the gateway table can be manually configured to map country (and area) codes having no gateway represented, to existing gateways in the closest country (or area) charging-wise. E.g. if an intranet has gateways to Sweden and Italy and a caller inside the intranet wants to call an external destination in Norway, it would probably be wise to route the call through the gateway in Sweden. This means that an entry for country code 47 (Norway) would be manually configured to map to the callSignalAddress of the gateway residing in Sweden.

Figure 3:
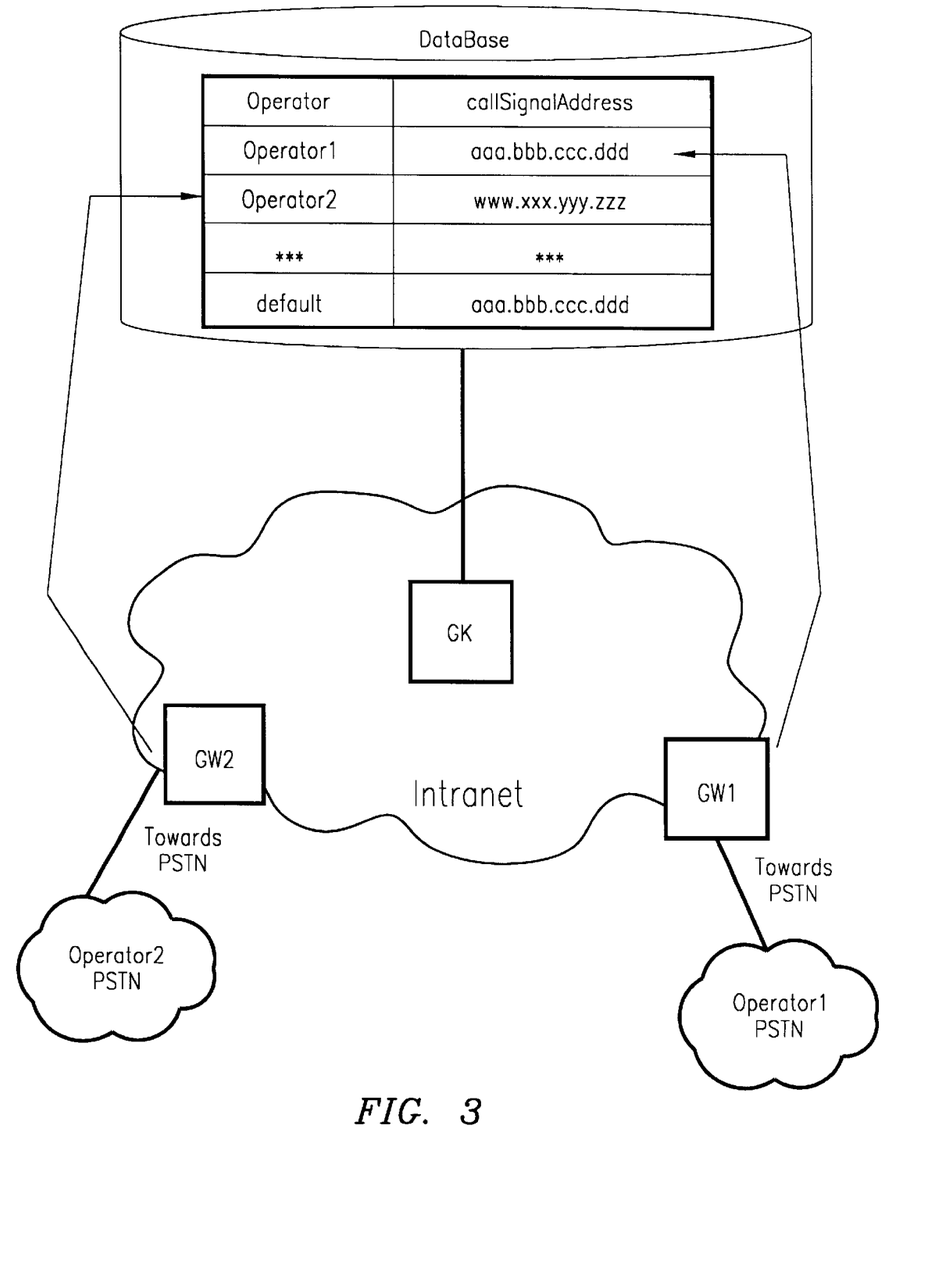
FIG. 3 is a simplified view illustrating another embodiment of the present method, especially the use of gateway-table for operator priority.

In the new situation arising many places in the world where traditional telephone operators no longer has monopoly in their own countries, it could be advantageous to be able to route calls more intelligently depending on which operator gives the best offer at any time. With this invention this could be done by letting the gateway register with information on what operator is connected to the gateway on the PSTN/telephone network side. The gatekeeper(s) would keep a table updated (by adding information as gateways register) of all the gateways addresses and their corresponding PSTN operators. The table could be arranged as illustrated in FIG. 3, and then so that the operator giving the best offer on PSTN/telephony charge at any time would be listed at the top with highest priority. This will make it possible to negotiate better deals with the different operators by easily being able to switch priority of gateway choice.

Figure 4:
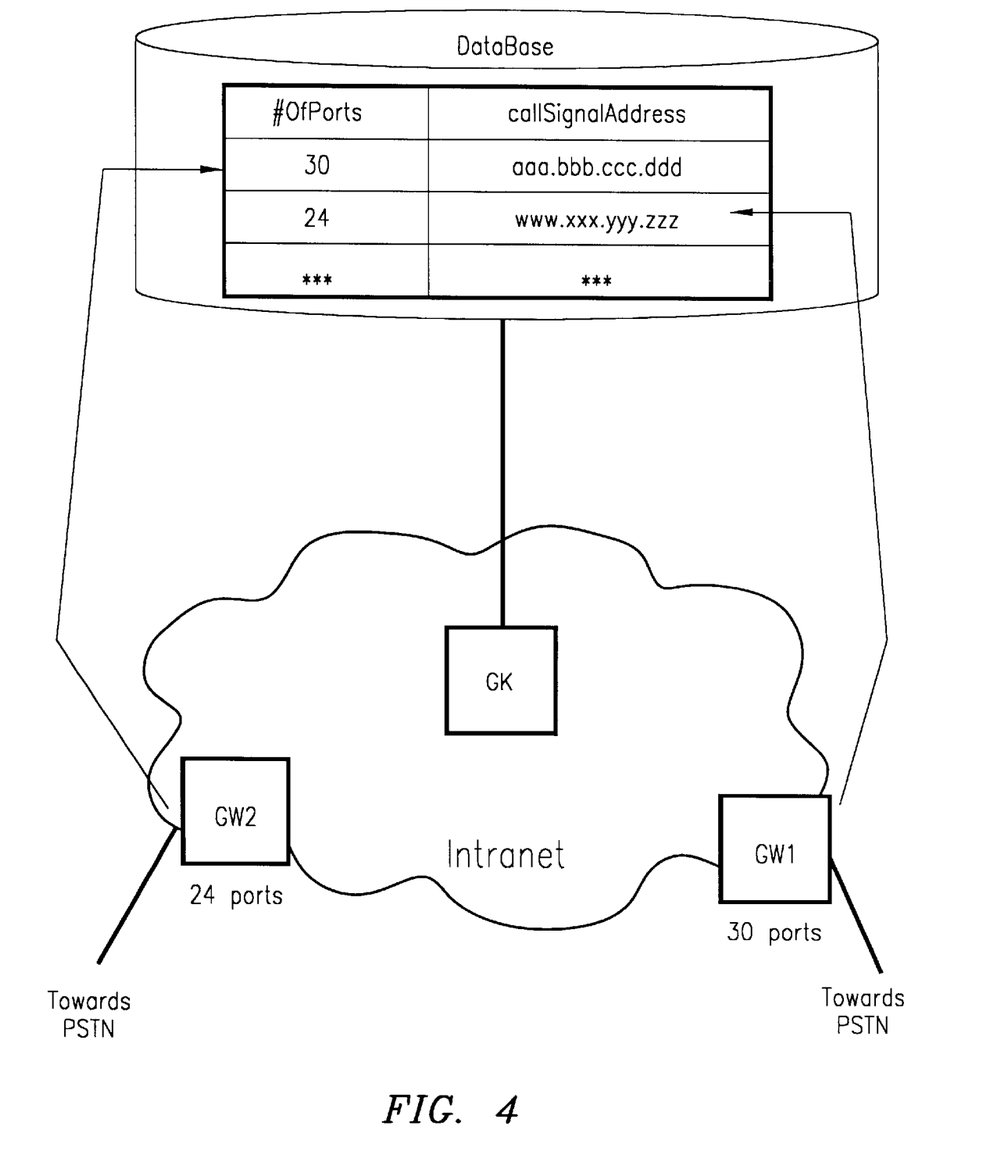
FIG. 4 is a simplified view of still another embodiment of a network configuration wherein the method according to the invention can be applied, especially in connection with use of gateway-table for resource management.

So far this invention proposal has focused on the charging issue of the invention. The invention can however be applied in a way where focus in on e.g. quality of service or resource handling, as this is illustrated in FIG. 4. The only difference would be the implementation of the gateway table and what data is sent from the gateways upon registration. More precisely, if e.g. the gateways send along the total number of ports (lowest bandwidth resolution line it has available e.g. 64 kbit/s—higher bandwidth is served with one call using several ports on the gateway e.g. 384 kbit/s=6×64 kbit/s=6 ports) to the gatekeeper(s), a table can be made showing available ports available at any time. If a gatekeeper wants to set up a call through a gateway, it would refer to the table and see which gateway has available ports and thereby do resource management. After selecting a gateway with available ports, the number of available ports available for the chosen gateway will have to be reduced by the amount of ports the current call is using. Upon completion of the call, the gatekeeper will have to add the number of ports to this gateway in the table. If all entries in the table have 0 ports available, the call would have to be rejected as there are no gateway ports available to support the call.

Figure 5:
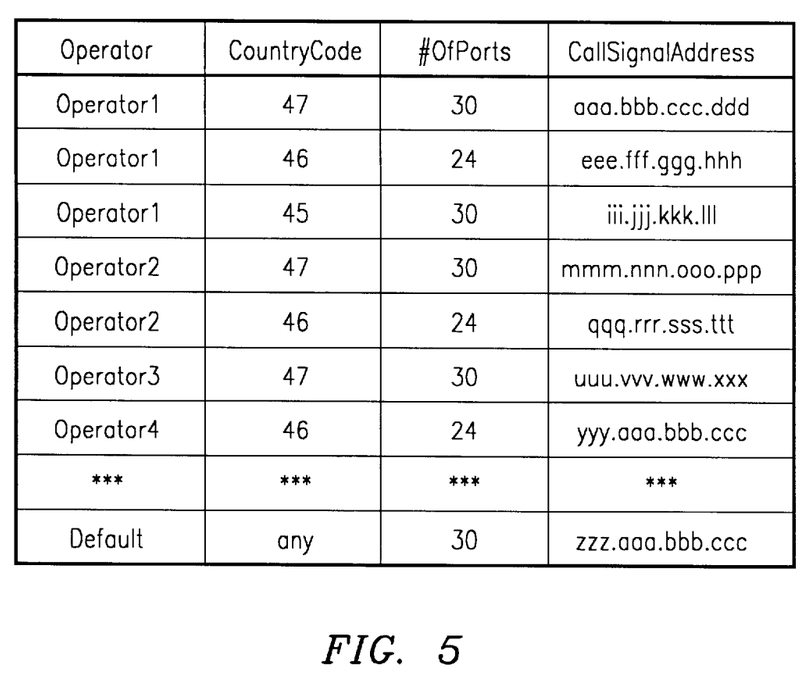
FIG. 5 illustrate a table wherein various gateway functions are combined.

The introduction of different criteria for routing calls leads to the combined solution where country code, operator and number of ports are integrated into one table to give a more intelligent way of routing calls, which is illustrated by the Table in FIG. 5.

The table could be designed to match the criteria the "owner" of the intranet wants to use when making external calls through gateways. By this is meant that e.g. in the case where someone wants to make a call to country code 47, and all ports on the preferred operators gateway to that country is occupied, one might choose to do one of the following:

1. Choose same operator, but go through gateway. residing in another country, or . . .
2. Choose next operator on the list, which has a gateway to country 47 with available resources (ports).

Figure 6:
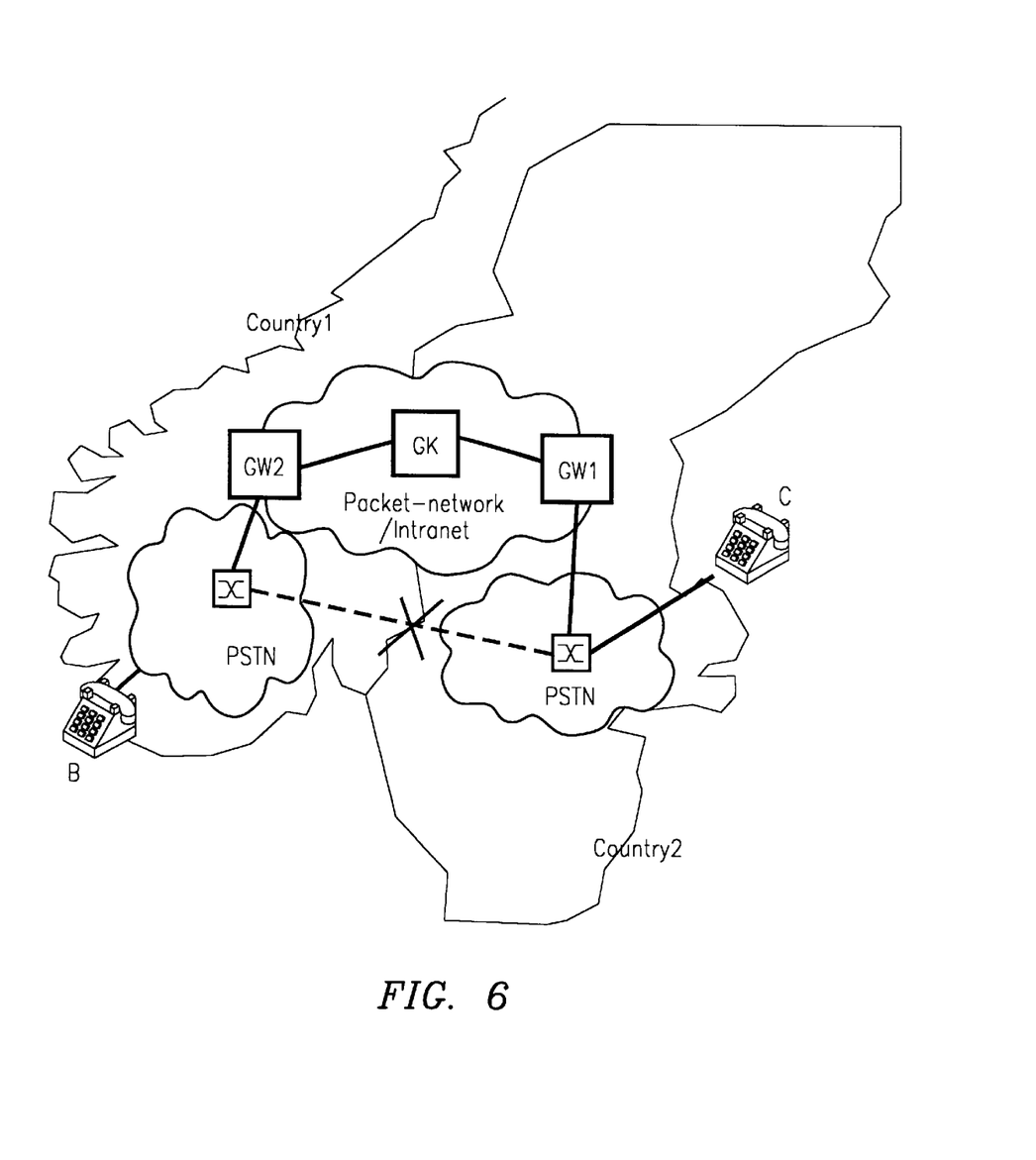
FIG. 6 is yet another network configuration illustrating another aspect of the present invention, especially in connection with using an intranet with optimazing gateways as a transferring network or backbone for two or more external networks.

In FIG. 6 there is illustrated how the invention could also be used when one wishes to use the packet network (intranet) as a transport or backbone network for other external networks. Subscriber. C is a PSTN subscriber, and he wishes to call another PSTN subscriber in e.g. another country or region. He would normally just call the number to B and have the call set up through the international or national PSTN network. However, another option would be for C to call a gateway to a packet network (intranet) and route the call through that network in order to avoid expensive long distance calls or in cases where subscriber B cannot be reached directly going only over the PSTN network (e.g. errors on line, all lines occupied etc.). The packet network would then use the invention described earlier in this document to route the call to the gateway residing closest chargingwise to subscriber B. In order for subscriber C to call B this way he must input number both to the gateway he wishes to use going into the packet network and the number to subscriber B. This however, is not different from a traditional call into the packet-network from an external network and hence vill not be further described here.

Advantages

The invention gives the owner of the intranet:

Cost reductions since the number of expensive international or long distance calls can be reduced since gateways can be put in countries which the intranet already has direct access to and has a considerable amount of traffic to. Other solutions have been proposed that should make the owner of the intranet able to negotiate better deals with telephony operators by the use of gateway routing tables.

Flexibility to negotiate better deals with different telephony service providers by automatically routing the bulk part of the calls to the provider with the best offer (e.g. by setting the number 1 priority or default entry in the gateway-table to point to the "best offer" provider).

Load distribution by selecting different gateways for different destinations and thereby automatically distribute load geographically.

Redundancy if gatekeeper can choose another gateway in another area/country if problems arise in another gateway or public telephony network.

Resource Management through scan of ports available at any time at each gateway.

Use of intranet as transport or backbone network for external networks.

What is claimed is:

1. A system for routing calls from a first terminal in a first telecommunications network to a second terminal in an external telecommunications network having a plurality of geographical regions, said system comprising:

a plurality of gateways, each of said plurality of gateways being for routing calls from said packet network to an associated geographical region of said plurality of geographical regions of said external telecommunications network; and a routing entity for selecting one of said plurality of gateways for routing a particular call from the first terminal in said packet network to the second terminal in said external telecommunications networkbased upon predetermined criteria, and for routing the call from the first terminal to the second terminal through the selected one of said plurality of gateways, said routing entity including a routing table containing predetermined information about the plurality of geographical regions, said predetermined information including at least a portion of telephone numbers reflecting codes for each of said plurality of geographical regions and cost levels for each of said plurality of geographical regions, and a quality of service table reflecting quality of service for each of said plurality of gateways, wherein said predetermined criteria include a criterion reflecting said codes for each of said plurality of geographical regions a criterion reflecting cost levels for each of said plurality of geographical regions, and a quality of service criterion reflecting available ports at any particular one of said plurality of gateways and whether a call is an audio call, an audio and video call or a data call.

2. The system according to claim 1, wherein said predetermined criteria are updated each time a gateway is added to or removed from said plurality of gateways.

3. The system according to claim 1, wherein said at least a portion of telephone numbers reflecting codes for each of said plurality of geographical regions includes a country code and/or an area code.

4. A system for routing calls from a first terminal in a packet network to a second terminal in an external telecommunications network having a plurality of geographical regions, said system comprising:

a plurality of gateways, each of said plurality of gateways being for routing calls from said packet network to an associated geographical region of said plurality of geographical regions of said external telecommunications network; and a routing entity for selecting one of said plurality of gateways for routing a particular call from the first terminal in said packet network to the second terminal in said external telecommunications network based upon predetermined criteria, and for routing the call from the first terminal to the second terminal through the selected one of said plurality of gateways, said routing entity including a routing table containing predetermined information about the plurality of geographical regions, said predetermined information including at least a portion of telephone numbers reflecting codes for each of said plurality of geographical regions and cost levels for each of said plurality of geographical regions, and an available resource table reflecting available resources for each of said plurality of gateways, said available resources including available port resources at each of said plurality of gateways, wherein said predetermined criteria include a criterion reflecting said codes for each of said plurality of geographical regions a criterion reflecting cost levels for each of said plurality of geographical regions, and a criterion reflecting available ports at any particular gateway, and wherein said routing entity selects a gateway with optimum port resource availability based upon the call being an audio call, an audio and video call or a data call.

5. The system according to claim 4, wherein said predetermined criteria are updated each time a gateway is added to or removed from the plurality of gateways.

6. And The system according to claim 4, wherein said at least a portion of telephone numbers reflecting codes for each of said plurality of geographical regions includes a country code and/or an area code.

7. A system for routing calls from a first terminal in a packet network to a second terminal in an external telecommunications network having a plurality of geographical regions, said system comprising:

a plurality of gateways, each of said plurality of gateways being for routing calls from said packet network to an associated geographical region of said plurality of geographical regions of said external telecommunications network; and a routing entity for selecting one of said plurality of gateways for routing a particular call from the first terminal in said packet network to the second terminal in said external telecommunications network based upon predetermined criteria, and for routing the call from the first terminal to the second terminal through the selected one of said plurality of gateways, said routing entity including a routing table containing predetermined information about the plurality of geographical regions, said predetermined information including at least a portion of telephone numbers reflecting codes for each of said plurality of geographical regions, and a cost level table reflecting cost levels of each of the plurality of geographical regions, and wherein said predetermined criteria include a criterion reflecting said codes for each of said plurality of geographical regions a criterion reflecting cost levels for each of said plurality of geographical regions, and a criterion reflecting the cost levels of each of said plurality of geographical regions, wherein said routing entity selects a gateway to connect with the geographical region that supplies a most cost-effective external connection for the call from the first terminal to the second terminal.

8. The system according to claim 7, wherein said predetermined criteria are updated each time a gateway is added to or removed from said plurality of gateways.

9. The system according to claim 7, wherein said at least a portion of telephone numbers reflecting codes for each of said plurality of geographical regions includes a country code and/or an area code.

* * * * *

UNITED STATES PATENT AND TRADEMARK OFFICE
CERTIFICATE OF CORRECTION

PATENT NO. : 6,366,576 B1
DATED : April 2, 2002
INVENTOR(S) : Børge Haga

It is certified that error appears in the above-identified patent and that said Letters Patent is hereby corrected as shown below:

Column 4,
Line 7, replace "destinationaddress" with -- destinationAddress --

Column 5,
Line 41, replace "Subscriber." with -- Subscriber --

Column 6,
Lines 18-19, replace "first telecommunications" with -- packet --
Line 30, replace "networkbased" with -- network based --

Column 8,
Lines 20-21, delete "a criterion reflecting cost levels for each of said plurality of geographical regions,"

Signed and Sealed this

Fifteenth Day of October, 2002

Attest:

Attesting Officer

JAMES E. ROGAN
*Director of the United States Patent and Trademark Office*